May 9, 1939.  F. W. ALLES ET AL  2,157,313
CONDITIONING METAL STOCK WHILE IN TRANSIT
Filed July 25, 1936  2 Sheets-Sheet 1
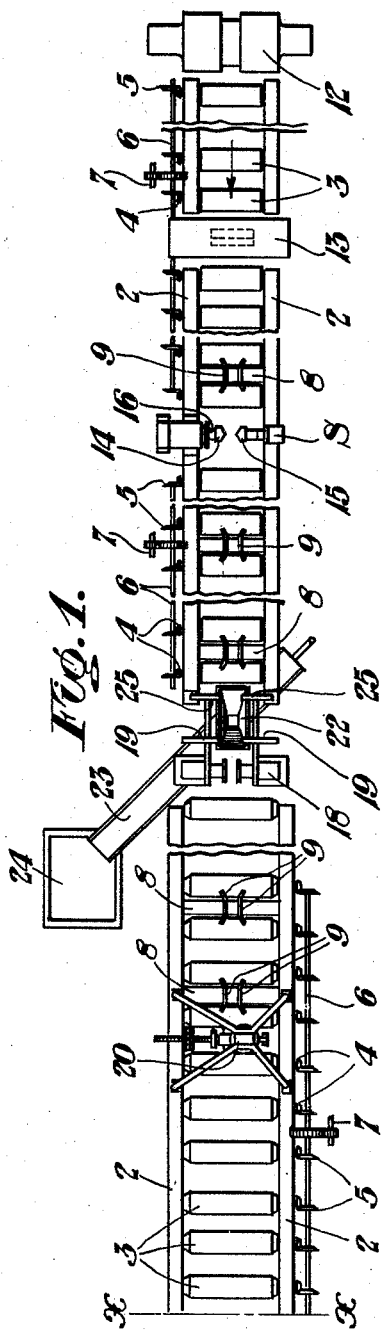
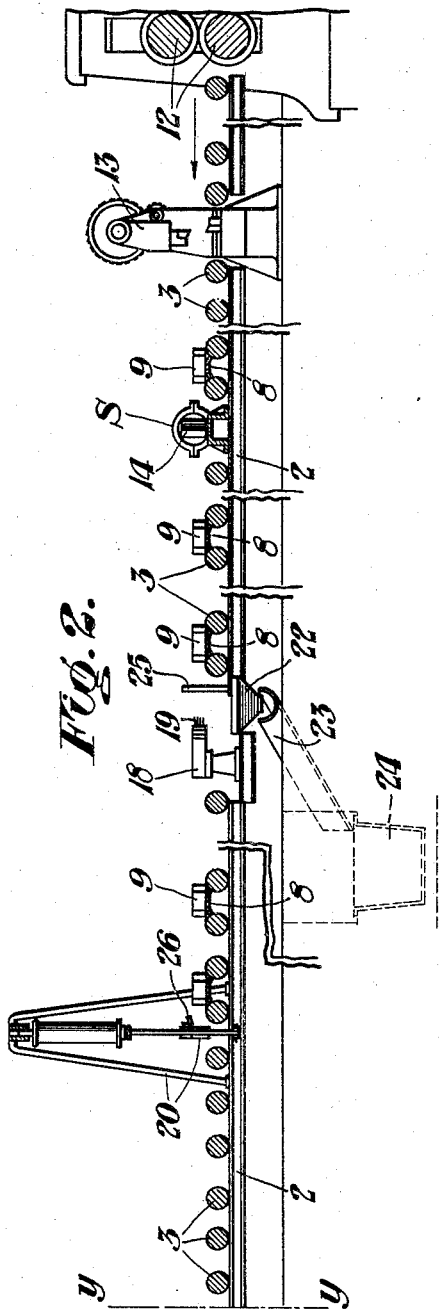
Inventors:
FRED W. ALLES and
FRANK N. SARBER.
by: Usina & Rauber
their Attorneys.

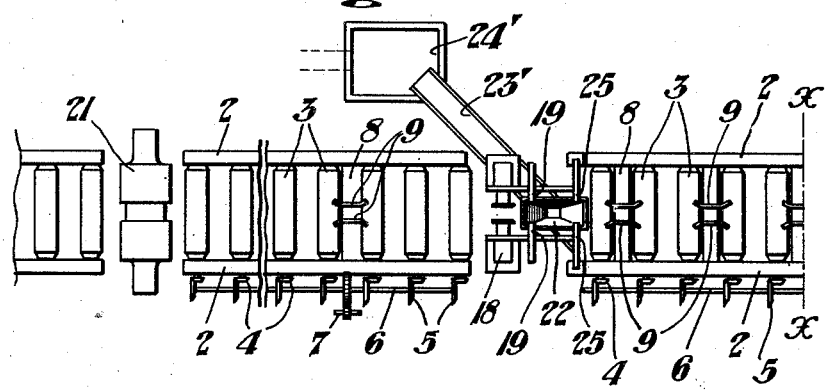
Fig. 1.ª
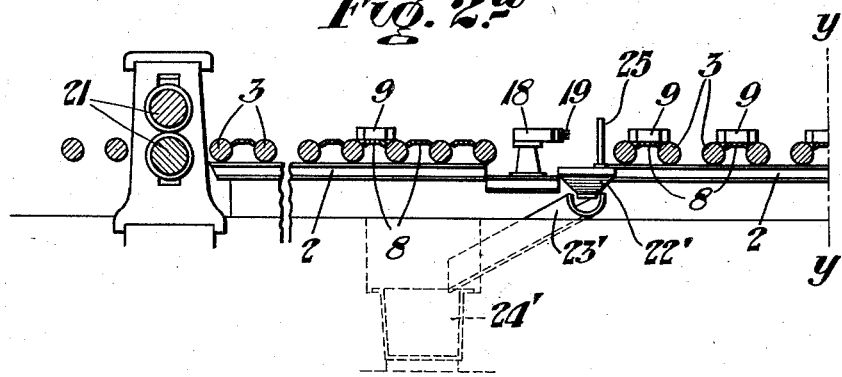
Fig. 2.ª
Inventors:
FRED W. ALLES and
FRANK N. SARBER.
by: their Attorneys.

Patented May 9, 1939

2,157,313

UNITED STATES PATENT OFFICE 2,157,313

CONDITIONING METAL STOCK WHILE IN TRANSIT

Fred W. Alles, Glassport, and Frank N. Sarber, McKeesport, Pa., assignors to National Tube Company, a corporation of New Jersey Application July 25, 1936, Serial No. 92,678

6 Claims. (Cl. 29—33)

The present invention relates to the continuous treatment of a hot body of metal and particularly hot ingots, blooms or billets while they are in transit from a blooming-mill to subsequent processing devices on a transfer table.

An object of the present invention resides in providing means, associated with the transfer table, for shearing the hot metal into lengths and shaping the ends of the sheared metal so as to facilitate its entry into the subsequent processing devices.

A further object includes skinning the hot body of metal to remove the scale and slag from its surface and means for turning the metal so as to present the unskinned sides for a skinning operation.

Under the present practice, blooms are permitted to cool after being sheared and then submitted to inspection to disclose seams and surface defects which are indicated on the material, so that these defects may subsequently be removed by burning with an oxy-acetylene torch, chipping with an air hammer, or grinding by hand, all of which necessitate increased man power and delay in production.

Another procedure involves rolling the bloom directly into bars as it comes from the blooming-mill, allowing the bars to cool, and then peeling, machining or otherwise removing the material from the entire surface of the bar in specially designed turning, planing or milling machine.

These processes are expensive and slow up production. However, under the present continuous process, permitted by the present apparatus, a quick and efficient means is provided in a single continuous operation to present the hot metal body at the bar mill in the least amount of time and with the least amount of defects in the metal.

Other objects and advantages will become apparent as the description proceeds, in which:

Figure 1 is a plan of the apparatus for carrying out the process of the present invention;

Figure 1ª is a continuation of Figure 1;

Figure 2 is a sectional elevational view of the present invention; and

Figure 2ª is a continuation of Figure 2.

In the drawings, the rolling-mill transfer table, indicated generally by the side-frames 2, is provided with a plurality of feed-rollers 3, having a pinion 4 adapted to mesh with pinions 5 keyed to a shaft 6 which is driven, through suitable connections, by a main drive-shaft 7. Suitable mechanism, not shown, may be provided for reversing the rotation of the feed-rollers 3 at any predetermined point or points throughout the process.

Aprons 8, secured to the side-frames 2 and positioned at points along the line of travel of the material and between the feed-rollers 3, are provided with guide-plates 9 adapted to properly direct and confine the travel of the hot body of metal in transit, with respect to its axis, within closely defined limits so as to cause the hot metal body to pass through the various treatment stages in proper alignment with the respective apparatus combined with the rolling-mill table.

The blooming-rolls are indicated generally at 12 while the shearing mechanism is indicated generally at 13, being located at a point near the blooming-rolls or the entering end of the table 2. The device for shaping the ends of the hot metal body, after it has been sheared into predetermined lengths, is indicated generally at S and comprises oppositely disposed die-members 14 and 15, having oppositely inclined surfaces, operated toward and away from contact with the work by means of the plungers 16, in any conventional manner. This shaping device S is adapted to taper the flared ends of the hot metal after it has been sheared so as to facilitate its entry into the subsequent treatment stages. This shaping device is positioned between the shearing mechanism 13 and the skinning apparatus hereinafter described.

Mounted on the side-frames 2 of the transfer table are slag baffle-plates 25 adapted to divert the slag and scale, removed during the skinning process, so as to drop into and be deposited from the hopper 22 through the trough 23 into the receptacle 24. The apparatus for removing the scale and slag from the sides of the hot metal lengths of material consists generally of what is termed a skinning machine 18, supported in a suitable manner for cooperation with the transfer table 2, and includes a plurality of oxy-acetylene torch members 19, positioned on opposite sides of the material in transit.

As the hot body of metal approaches the skinning machine, the feed of said metal is stopped momentarily to permit the torches to be advanced to a working position with respect to two sides of the hot body of metal. Preheating by the torches being effected, the feed-rollers are again actuated and the hot body of metal travels at the required speed past the torches which function to skin or condition the two vertical sides of the hot body of metal by removing the scale and slag therefrom.

Guide-plates 9 are provided at the outlet end of the skinning machine and in advance of a turning device, indicated generally at 20. This turning device is secured to the transfer table or otherwise positioned to cooperate with the line of travel of the hot metal lengths. When the material enters the guide-plate 26, it properly positions the hot metal material within the turning mechanism and the feeding of said material is stopped momentarily to permit turning of the hot metal lengths to present the unskinned sides in proper position to have the scale and slag removed therefrom by the skinning machine. If there is only one skinning machine used, rotation of the feed-rolls is reversed after the metal has been turned, the torches 19 are retracted to permit the length of material to pass backwardly therethrough, after which the rotation of the rollers is changed to a forward direction, the torches moved inwardly to engage the work and the unskinned sides of the hot body of metal skinned to remove the scale and slag. The completely skinned hot metal length then passes on to the bar-mill for subsequent treatment for size reduction or directly to the tube forming apparatus for forming the tube from a bloom rather than from a billet.

Should it be desired, a second skinning machine may be provided, as shown in Figures 1ª and 2ª, and positioned between the turning device 20 and the bar-mill or tube forming apparatus 21. Under this arrangement, there would be no reverse movement of the hot metal length to the skinning machine to skin the unskinned sides of the hot metal.

In carrying out the present method, the hot metal body is received from the blooming-mill 12, propelled by the feed-rollers 3 to the shearing mechanism 13 where it is halted momentarily and cut into predetermined lengths. The severed length is then directed through the guides 9 and the material enters the end of the shaping mechanism S where it is stopped momentarily to permit tapering of the flared ends of the material caused by the shearing action. This facilitates entry of the hot material into the skinning machine 18 where, under the action of the oxy-acetylene torch, the scale and slag is removed from the material while it is in transit to subsequent processing devices. As the hot material approaches the torches 19, it is stopped momentarily for preheating, the torches being advanced to working position by suitable valve control mechanism, and the feed-rollers again actuated; the hot material passes between the torches which skin or remove the scale or slag from the vertical sides thereof.

For reception of the removed slag a hopper 22 with inclined sides is located under the torch batteries 19 and the slag baffle 25. The slag, propelled by the force of the expanding gas of the torch flame, strikes the baffle 25 and falls into the hopper 22. A stream of water is caused to cascade down the sides of the hopper 22 to interpose a sheet (as it were) of water between the steel sides of the hopper 22 and the semi-fluid slag, disintegrating the slag and conducting it to the inclined trough 23 which carries a stream of water of volume enough to propel the slag to a bucket 24 with perforated bottom permitting the water to flow to the sewer while the slag is retained in the bucket 24. A further purpose of the cascade of water down the sides of the hopper 22 is to prevent adherence of the semi-molten slag to the steel sides of the hopper.

After the hot metal has been skinned on two sides, it is guided into the turning device 20 and halted momentarily to permit, through suitable mechanism, the turning of the hot metal body substantially through an angle of 90 degrees, thereby bringing the unskinned sides of the hot material to a vertical position in order that they may be skinned either by reversing rotation of the feed-rollers 3 to cause the material to pass back through the skinning machine 18 for skinning operation or, in case there is a second skinning machine, as shown in Figures 1ª and 2ª, positioned between the turning device 20 and the bar-mill or tube forming apparatus 21, to continue in a forward direction into the second skinning machine for removing the scale and slag from the unskinned sides. Where it is desired to have two skinning machines, as shown in Figures 1ª and 2ª, a similar hopper 22' and trough 23' convey the scale or slag from the second skinning machine to the receptacle 24'.

The particular detailed mechanism of the end-shaping device S and the metal turning device 20 are not shown in the present application as they are subject matter for separate applications which have been filed concurrently herewith, and are only covered in their broadest scope in combination with the continuous treatment of hot metal while in transit.

While we have shown and described specific embodiments of the present invention, it is expressly understood that we do not wish to be limited exactly thereto, since various modifications may be made without departing from the scope of the present invention as defined in the following claims.

We claim:

1. In the continuous treatment of a body of hot metal, the steps which consist in tapering the ends of said hot metal to facilitate its entry into subsequent processing devices, skinning two sides of said shaped metal while hot, turning the shaped and skinned metal to position the unskinned sides of said metal in a line with the original pass line of said metal for skinning, all of said steps being done while said body of metal is in transit on a mill transfer table and prior to reaching a bar-mill.

2. An apparatus for conditioning a substantially rectangular body of hot metal in transit from a blooming-mill to a bar-mill which comprises conveying said body of hot metal from said blooming-mill, means adapted to shear said rectangular metal into predetermined lengths, means adapted to shape the ends of said sheared metal lengths, means adapted to skin two sides of said lengths of hot metal while in transit, means adapted to turn said shaped and skinned metal to position the unskinned sides of said metal in position for skinning, means adapted to skin the sides of the turned body of metal and means adapted to convey said hot metal to other processing devices.

3. In combination with a rolling-mill transfer table, a blooming-mill and a bar-mill, means adapted to feed a substantially rectangular body of hot metal from said blooming-mill, the travel of said rectangular body of hot metal being stopped at predetermined intervals between said blooming and rolling mills, means adapted to shear said hot body of metal into predetermined lengths, means adapted to taper the flared ends of said sheared lengths of hot metal to facilitate entry thereof into subsequent processing devices, means adapted to guide said hot lengths of metal in their travel over said transfer table, means for simultaneously skinning two sides of said shaped hot metal lengths, means adapted to present the unskinned sides of said sheared, shaped and skinned hot metal lengths to skinning means for skinning and means adapted to convey said completely skinned hot metal sheared lengths to a bar-mill.

4. In the continuous treatment of a body of hot metal, the steps which consist in feeding a substantially rectangular body of hot metal from a blooming-mill, shearing the rectangular body of hot metal into predetermined lengths, tapering the flared ends of the sheared rectangular lengths of hot metal to facilitate entry thereof into subsequent processing devices, skinning two sides of the shaped rectangular lengths of hot sheared metal, turning the shaped and skinned lengths of hot metal about their own axis to present the unskinned sides of the shaped rectangular lengths on the original pass line traveled by the lengths of metal, skinning the unskinned sides of the rectangular lengths of hot sheared metal and conveying the completely skinned end tapered sheared hot metal lengths to a bar-mill.

5. An apparatus for conditioning a substantially rectangular body of hot metal in transit from a blooming-mill to a bar-mill which comprises conveying said body of hot metal from said blooming-mill, means adapted to shear said rectangular metal into predetermined lengths, means adapted to skin two sides of said lengths of hot metal while in transit, means adapted to turn said skinned metal to position the unskinned sides of said metal in position for skinning, means adapted to skin the sides of the turned body of metal and means adapted to convey said hot metal to other processing devices.

6. In the continuous treatment of a body of hot metal, the steps which consist in feeding a substantially rectangular body of hot metal from a blooming-mill, shearing the rectangular body of hot metal into predetermined lengths, skinning two sides of the rectangular lengths of hot sheared metal, turning the skinned lengths of hot metal about their own axis to present the unskinned sides of the rectangular lengths on the original pass line traveled by the lengths of metal, skinning the unskinned sides of the rectangular lengths of hot sheared metal and conveying the completely skinned hot metal lengths to a bar-mill.

FRED W. ALLES.
FRANK N. SARBER.